US010089975B2

(12) United States Patent
Fume et al.

(10) Patent No.: US 10,089,975 B2
(45) Date of Patent: Oct. 2, 2018

(54) TRANSLITERATION WORK SUPPORT DEVICE, TRANSLITERATION WORK SUPPORT METHOD, AND COMPUTER PROGRAM PRODUCT

(71) Applicant: Kabushiki Kaisha Toshiba, Tokyo (JP)

(72) Inventors: Kosei Fume, Kanagawa (JP); Masahiro Morita, Kanagawa (JP); Yuka Kuroda, Kanagawa (JP); Yoshiaki Mizuoka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 15/268,356

(22) Filed: Sep. 16, 2016

(65) Prior Publication Data

US 2017/0004822 A1 Jan. 5, 2017

Related U.S. Application Data

(63) Continuation of application No. PCT/JP2014/061486, filed on Apr. 23, 2014.

(51) Int. Cl.
*G06F 17/24* (2006.01)
*G10L 13/10* (2013.01)
(Continued)

(52) U.S. Cl.
CPC .............. *G10L 13/10* (2013.01); *G06F 17/21* (2013.01); *G10L 13/08* (2013.01); *G10L 2013/083* (2013.01)

(58) Field of Classification Search
CPC ...................................................... G06F 17/24
(Continued)

(56) References Cited

U.S. PATENT DOCUMENTS 7,752,034 B2 * 7/2010 Brockett ............. G06F 17/2765
704/2
7,908,132 B2 * 3/2011 Brockett ............... G06F 17/289
704/1
(Continued)

FOREIGN PATENT DOCUMENTS

JP 61-107470 5/1986
JP 6-110887 4/1994
(Continued)

OTHER PUBLICATIONS

Written Opinion dated Jul. 8, 2014, in counterpart International Application No. PCT/JP2014/061586; 5 pages.
(Continued)

*Primary Examiner* — Susan McFadden
(74) *Attorney, Agent, or Firm* — Finnegan, Henderson, Farabow, Garrett & Dunner, L.L.P.

(57) ABSTRACT

According to an embodiment, a transliteration work support apparatus include an input unit, an extraction unit, a presentation unit, a reception unit, and a correction unit. The input unit receives document information. The extraction unit extracts, as a correction part, a surface expression of the document information that matches a correction pattern expressing a plurality of surface expressions having the same regularity in way of correction in one form. The presentation unit presents a way of correction defined in accordance with the correction pattern used in the extraction of the correction part. The reception unit receives selection of the way of correction. The correction unit corrects the correction part based on the selected way of correction.

8 Claims, 13 Drawing Sheets

(51) Int. Cl.
*G06F 17/21* (2006.01)
*G10L 13/08* (2013.01)

(58) Field of Classification Search
USPC .......................................................... 704/260
See application file for complete search history.

(56) References Cited

U.S. PATENT DOCUMENTS

| 9,280,967 B2 | 3/2016 | Fume et al. |
| 2012/0072204 A1 | 3/2012 | Nasri et al. |

FOREIGN PATENT DOCUMENTS

| JP | 7-295983 | 11/1995 |
| JP | 10-222187 | 8/1998 |
| JP | 2007-199410 | 8/2007 |
| JP | 2007-323323 | 12/2007 |
| JP | 2009-110497 | 5/2009 |
| JP | 2011-138343 | 7/2011 |
| JP | 2011-170191 | 9/2011 |
| JP | 2012-198277 | 10/2012 |
| WO | WO-2015/052817 | 4/2015 |

OTHER PUBLICATIONS

International Search Report dated Jul. 8, 2014, in counterpart International Application No. PCT/JP2014/061486; 6 pages.

\* cited by examiner

FIG.2

| DOCUMENT ID | LINE NUMBER | START POSITION | END POSITION | SURFACE EXPRESSION | ATTRIBUTE | ATTRIBUTE VALUE |
|---|---|---|---|---|---|---|
| 34 | 1 | 1 | 12 | 作業名：音訳<br>文書編集支援 | HTML | title |
| 34 | 3 | 17 | 18 | DB | WAY OF READING | DATABASE |
| 34 | 4 | 8 | 11 | はいって | WAY OF READING | 入って ～16 |
| 58 | 2 | 1 | 15 | 〈お知らせ〉<br>新機能追加に<br>ついて | SSML | pitch=+1 ～15 |
| 58 | 4 | 5 | 7 | dic | WAY OF READING | DICTIONARY |
| 101 | 3 | 4 | - | - | PAUSE | LONG |
| 101 | 3 | 9 | - | - | PAUSE | LONG |

FIG.3

DOCUMENT ID: 34

DOCUMENT ID: 58

2014年1月20日
<お知らせ>新機能追加について

・ユーザdicの利用が可能になりました。
・検索や置換機能がご利用いただけるようになりました。
・利用規約を一部改訂いたしました。
…

FIG.5

DOCUMENT ID: 101

| SURFACE EXPRESSION | ATTRIBUTE | ATTRIBUTE VALUE |
|---|---|---|
| サシスセ・タチツテ AUTHOR·ILLUSTRATOR | PAUSE | サシスセ[S]・タチツテ[L] AUTHOR·ILLUSTRATOR |
| ナニヌ・ハヒ・マミム AUTHOR | PAUSE | ナニヌ[S]・ハヒ[S]・マミム[L] AUTHOR |

⬇

| CORRECTION PATTERN | ATTRIBUTE | ATTRIBUTE VALUE |
|---|---|---|
| $kana·$kana "AUTHOR·ILLUSTRATOR\|AUTHOR" | PAUSE | $kana[S]·$kana[L] "AUTHOR·ILLUSTRATOR\|AUTHOR" |

FIG.7

| SURFACE EXPRESSION | ATTRIBUTE | ATTRIBUTE VALUE |
|---|---|---|
| Step 1...Press the lock button for a long time of five seconds or longer while pressing the power button. | WAY OF READING | At Step 1, the following operation is performed. Press the lock button for a long time of five seconds or longer while pressing the power button. |
| Step 2...When a beep sound is emitted three times, release the hand. | WAY OF READING | At Step 2, the following operation is performed. When a beep sound is emitted three times, release the hand. |
| Step 3...Press "mode button" twice, and a current status is displayed... | WAY OF READING | At Step 3, the following operation is performed. Press "mode button" twice, and a current status is displayed... |
| Step 1...Press the lock button for a long time of five seconds or longer while pressing the power button. | Daisy | DaisyLevel 3 |
| Step 2...When a beep sound is emitted three times, release the hand. | Daisy | DaisyLevel 3 |
| Step 3...Press "mode button" twice, and a current status is displayed... | Daisy | DaisyLevel 3 |

⇨

| CORRECTION PATTERN | ATTRIBUTE | ATTRIBUTE VALUE |
|---|---|---|
| "Step" (+number)···($TEXT) | WAY OF READING | At "Step"%d, the following operation is performed. $TEXT |
| "Step" (+number)···($TEXT) | Daisy | DaisyLevel 3 |

FIG.8

| CORRECTION PATTERN ID | DOCUMENT ID | CORRECTION PATTERN | ATTRIBUTE | ATTRIBUTE VALUE | PRIORITY | APPEARANCE FREQUENCY |
|---|---|---|---|---|---|---|
| 1 | 1 | DB | WAY OF READING | DATABASE | 1 | TF=15(230) |
| 2 | 900 | DB | WAY OF READING | DRAGON BATTLE | 2 | TF=3(230) |
| 3 | 10 | db | WAY OF READING | DECIBEL | - | TF=5(10) |
| 4 | 1020 | DataBase | WAY OF READING | DATABASE | - | TF=12(123) |
| 5 | 101 | $NE/$NE "JOINT TRANSLATION" | PAUSE | $NE □/$NE □ "JOINT TRANSLATION" | - | - |
| 6 | 133 | $kana·$kana "AUTHOR· ILLUSTRATOR\| AUTHOR" | PAUSE | $kana □·$kana □ "AUTHOR· ILLUSTRATOR\| AUTHOR" | - | - |
| ... | ... | ... | ... | ... | ... | ... |

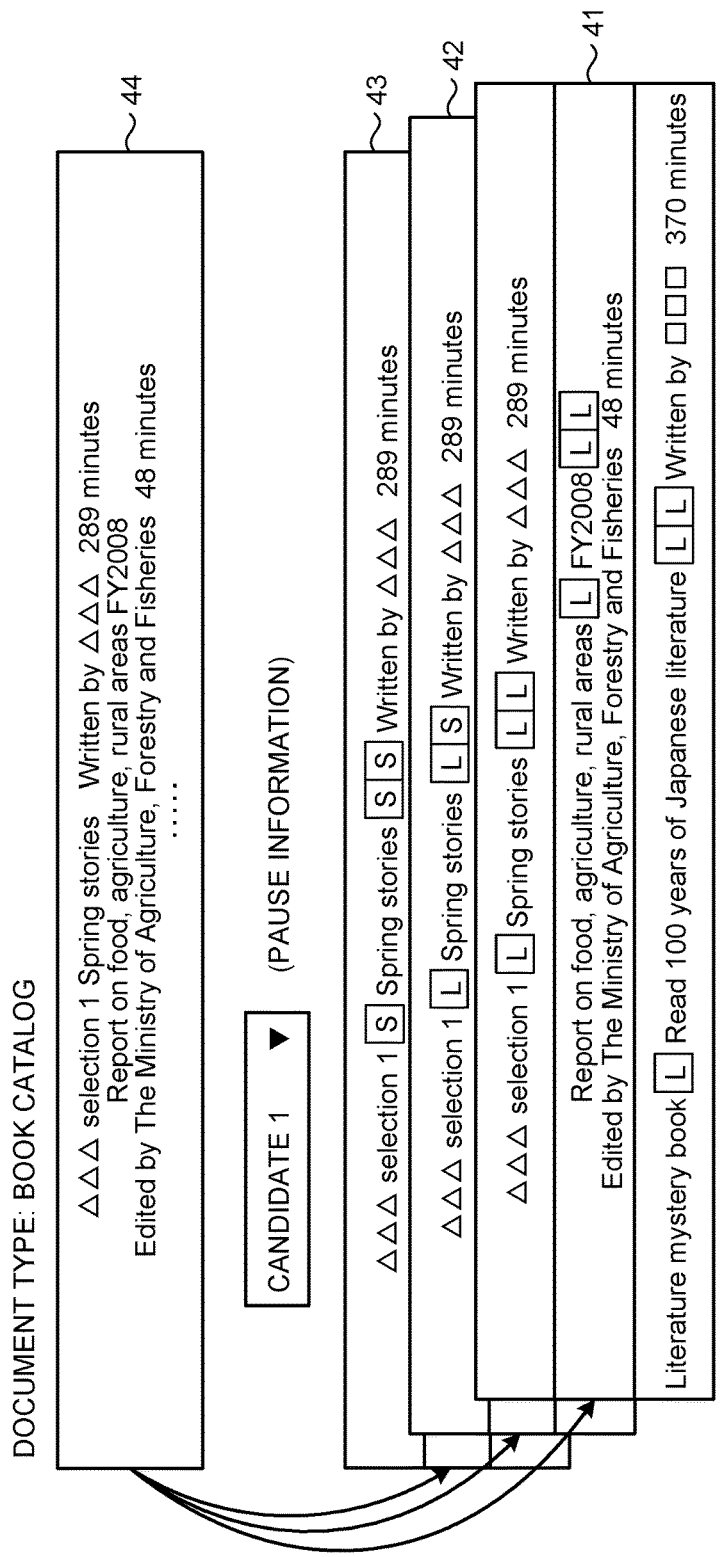

FIG.14

| CORRECTION PATTERN ID | DOCUMENT ID | CORRECTION PATTERN | ATTRIBUTE | ATTRIBUTE VALUE | PRIORITY | APPEARANCE FREQUENCY |
|---|---|---|---|---|---|---|
| D1 | 301 | - | NUMBER OF INDENT (NUMBER OF SPACE IN BEGINNING OF LINE) | 0 | - | - |
| D2 | 301 | - | NUMBER OF INDENT (NUMBER OF SPACE IN BEGINNING OF LINE) | 4 | - | - |
| D3 | 301 | - | NUMBER OF TIMES OF APPEARANCE OF DESCRIPTION BY ITEMIZATION | 3 | - | - |
| D4 | 301 | - | NUMBER OF TIMES OF FONT CHANGE | 8 | - | - |
| D5 | 301 | - | NUMBER OF TIMES OF APPEARANCE OF URL | 3 | - | - |
| D6 | 301 | - | NUMBER OF TIMES OF APPEARANCE OF NAMED ENTITY | 17 | - | - |
| ... | ... | ... | ... | ... | ... | ... |

TRANSLITERATION WORK SUPPORT DEVICE, TRANSLITERATION WORK SUPPORT METHOD, AND COMPUTER PROGRAM PRODUCT

CROSS-REFERENCE TO RELATED APPLICATIONS

This application is a continuation of PCT international application Ser. No. PCT/JP2014/061486 filed on Apr. 23, 2014 which designates the United States; the entire contents of which are incorporated herein by reference.

FIELD

An embodiment described herein relates generally to a transliteration work support apparatus, a transliteration work support method, and a computer program product.

BACKGROUND

The transliteration work for generating voice information based on document information is performed for mainly visually handicapped persons or persons with dyslexia. In the transliteration work, in order to improve the quality of voice information obtained by voice synthesis based on document information, reading errors or accent errors of the voice information are corrected, for example. The voice information or the composite document information including voice information that has been corrected by transliteration work is output from a dedicated reader such as hardware or an application, and used for users such as visually handicapped persons or persons with dyslexia.

BRIEF DESCRIPTION OF THE DRAWINGS

FIG. 2 is a diagram illustrating an example of corrected document information according to the embodiment;

FIG. 3 is a diagram illustrating an example of document information with a document ID 34 according to the embodiment;

FIG. 4 is a diagram illustrating an example of document information with a document ID 58 according to the embodiment;

FIG. 5 is a diagram illustrating an example of document information with a document ID 101 according to the embodiment;

FIG. 6 is a diagram illustrating a concrete example 1 in which a correction pattern is generated based on a plurality of correction examples;

FIG. 7 is a diagram illustrating a concrete example 2 in which a correction pattern is generated based on a plurality of correction examples;

FIG. 8 is a diagram illustrating an example of correction pattern information according to the embodiment;

FIG. 9 is a diagram illustrating a concrete example 1 of correction candidates presented by a presentation unit according to the embodiment;

FIG. 14 is a diagram illustrating an example of standard correction pattern information according to a modification of the embodiment.

DETAILED DESCRIPTION

According to an embodiment, a transliteration work support apparatus include an input unit, an extraction unit, a presentation unit, a reception unit, and a correction unit. The input unit receives document information. The extraction unit extracts, as a correction part, a surface expression of the document information that matches a correction pattern expressing a plurality of surface expressions having the same regularity in way of correction in one form. The presentation unit presents a way of correction defined in accordance with the correction pattern used in the extraction of the correction part. The reception unit receives selection of the way of correction. The correction unit corrects the correction part based on the selected way of correction.

Embodiments will be described in detail below with reference to the accompanying drawings.

Figure 1:
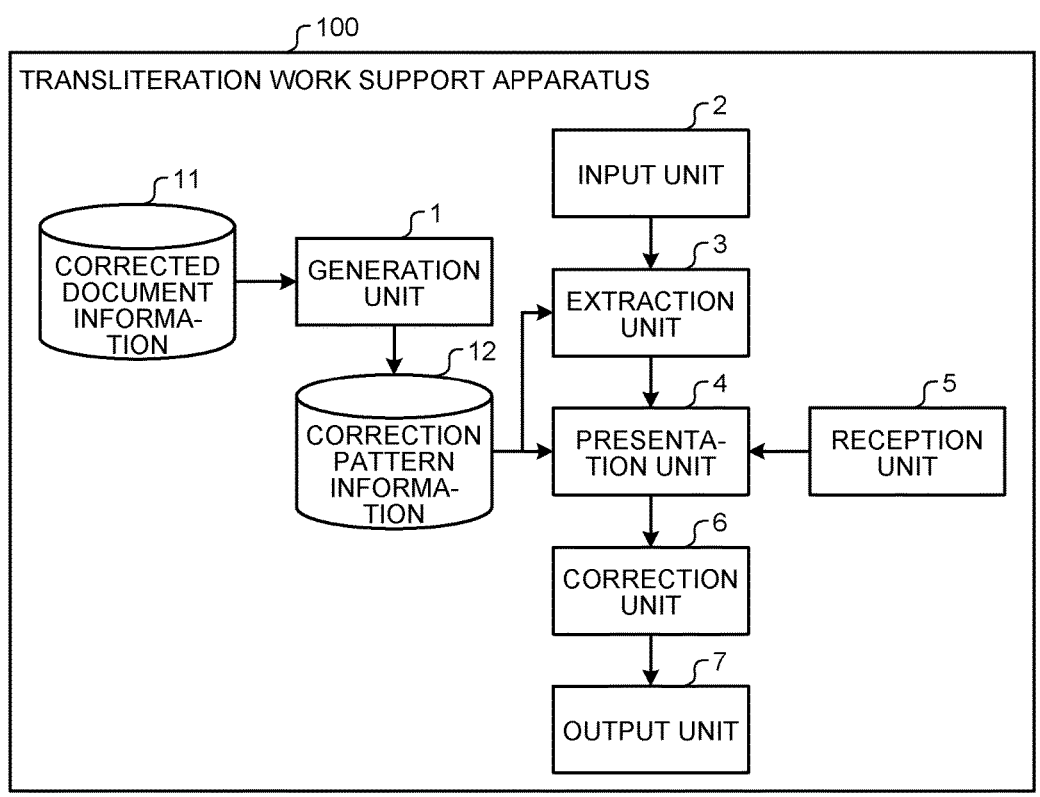
FIG. 1 is a diagram illustrating an example of a configuration of a transliteration work support apparatus according to an embodiment.

FIG. 1 is a diagram illustrating an example of a configuration example of a transliteration work support apparatus 100 according to an embodiment. The transliteration work support apparatus 100 includes a generation unit 1, an input unit 2, an extraction unit 3, a presentation unit 4, a reception unit 5, a correction unit 6, and an output unit 7. The transliteration work support apparatus 100 stores, in a storage unit not illustrated in FIG. 1, corrected document information 11 and correction pattern information 12.

The generation unit 1 generates the correction pattern information 12 based on a plurality of correction examples of the corrected document information 11. The correction pattern information 12 is information in which the collection of corrected surface expressions included in correction examples (hereinafter, referred to as a correction pattern) is associated with the kind of correction (an attribute described later) and a way of correcting an attribute (an attribute value described later). That is, the correction pattern is a collected pattern of corrected surface expressions included in correction examples when there is any regularity in way of correction.

First, the corrected document information 11 will be described. The corrected document information 11 stores correction examples (a history) of document information corrected by transliteration work. The information to be corrected in transliteration work is document information and the way of transliteration of words and symbols included in the document information. The document information is information including a document to be transliterated. The format of document information may be arbitrary. The document information may have configuration information (such as a tag) for outputting voice and a reading document in a composite document format allowing synchronous reproduction, for example.

FIG. 2 is a diagram illustrating an example of the corrected document information 11 according to the present embodiment. The corrected document information 11 is stored by a relational database management system (RDBMS) having a schema illustrated in FIG. 2, for example. The corrected document information 11 includes fields of a document ID, a line number, a start position, an end position, a surface expression, an attribute, and an attribute value. The document ID is identification information for uniquely identifying document information. The line number is the number of a line of a corrected surface expression. The start position indicates a position of the start of a corrected surface expression, which is expressed by the number of characters counted from the beginning of the line. The end position indicates a position of the end of a corrected surface expression, which is expressed by the number of characters counted from the beginning of the line, in the same manner as the start position. The surface expression is a surface expression corrected in the past. The attribute indicates the kind of correction. The attribute value indicates a way of correction.

Each record of the corrected document information 11 corresponds to each of correction examples in the past (a correction history). Each record of the corrected document information 11 will be described in detail. FIG. 3 is a diagram illustrating an example of document information with a document ID 34 according to the present embodiment. FIG. 4 is a diagram illustrating an example of document information with a document ID 58 according to the present embodiment. FIG. 5 is a diagram illustrating an example of document information with a document ID 101 according to the present embodiment.

The first record indicates an example in which "title" is given as meta information of hypertext markup language (HTML) to "作業名:音訳文書編集 支援" corresponding to the first to the 12th characters of the first line of sentences included in the document information with the document ID 34 (see FIG. 3). This example indicates correction for allowing the reader to read the title as a title by giving information indicating that it is a title to the surface expression "作業名:音訳文書編集 支援".

The second record indicates an example in which "database" is given as information indicating the way of reading "DB" corresponding to the 17th to the 18th characters of the third line of the sentences included in the document information with the document ID 34 (see FIG. 3). In this manner, the way of reading "DB" corresponding to the 17th to the 18th characters of the third line is not a "D-B" but a "database".

The third record indicates an example in which an attribute value 16 is given as information indicating the way of reading a surface expression 15 corresponding to the 8th to the 11th characters of the fourth line of the sentences included in the document information with the document ID 34 (see FIG. 3). In this manner, the way of reading the surface expression 15 corresponding to the 8th to the 11th characters of the fourth line is the way of reading the attribute value 16 that is a word including a Chinese character. Thus, segments of the sentence including the surface expression 15 in FIG. 3 become clear, which enables appropriate pronunciation and accents in reading, for example.

The fourth record indicates an example in which "pitch=+1" is given as meta information of speech synthesis markup language (SSML) to "＜お知らせ＞新機能追加について" corresponding to the first to the 15th characters of the first line of sentences included in document information with the document ID 58 (see FIG. 4).

The fifth record indicates an example in which "dictionary" is given as information indicating the way of reading "dic" corresponding to the fifth to the seventh characters of the fourth line of the sentences included in the document information with the document ID 58 (see FIG. 4). In this manner, the way of reading "dic" corresponding to the fifth to the seventh characters of the fourth line is not a "dic" but a "dictionary".

The sixth record indicates an example in which a long pause (an attribute "pause", an attribute value "long") is given after the fourth character of the third line of sentences included in the document information with the document ID 101 (see FIG. 5) (see a symbol 21 of FIG. 5). Similarly, the seventh record indicates an example in which a long pause (an attribute "pause", an attribute value "long") is given after the ninth character of the third line of the sentences included in the document information with the document ID 101 (see FIG. 5) (see a symbol 22 of FIG. 5). The pause indicates an interval in reading. The long pause is 0.9 seconds, for example, and the short pause is 0.3 seconds, for example.

Returning to FIG. 1, the generation unit 1 compares correction examples provided by each record of the corrected document information 11, and generates the correction pattern information 12 by collecting similar correction as one form. A concrete example of generating the correction pattern information 12 based on a plurality of correction examples will be described here.

FIG. 6 is a diagram illustrating a concrete example 1 in which a correction pattern is generated based on a plurality of correction examples. A table in the upper rows of FIG. 6 illustrates two correction examples. A table in the lower rows of FIG. 6 illustrates one correction pattern generated from two correction examples in the upper row. In the first correction example in the upper rows of FIG. 6, regarding the reading interval of a surface expression 60, a short pause (symbol 23) is inserted between a katakana description 61 and a symbol "•", and a long pause (symbol 24) is inserted between a katakana description 62 and "author/illustrator". In the second correction example in the upper rows of FIG. 6, regarding the reading interval of a surface expression 66, a short pause (symbol 25) is inserted between a katakana description 63 and a symbol "•", a short pause (symbol 26) is inserted between a katakana description 64 and a symbol "•", and a long pause (symbol 27) is inserted between a katakana description 65 and "author".

Two correction examples in the upper rows of FIG. 6 have the same regularity in way of correction. Thus, such two surface expressions in the upper rows of FIG. 6 can be collected as the correction pattern "$kana•$kana author•illustrator|author" in the lower rows of FIG. 6. Here, "$kana" indicates an arbitrary character string. Moreover, "author•illustrator|author" indicates "author•illustrator" or "author". Two attribute values in the upper rows of FIG. 6 can be collected as an attribute value 28 in the lower rows of FIG. 6. The attribute value 28 indicates the way of correction in which a short pause is inserted between "$kana" and "•", and a long pause is inserted between "$kana" and "author•illustrator|author".

FIG. 7 is a diagram illustrating a concrete example 2 in which a correction pattern is generated based on a plurality of correction examples. A table in the upper rows of FIG. 7 illustrates six correction examples. A table in the lower rows of FIG. 7 indicates correction patterns generated from six correction examples in the upper rows. The correction pattern in the lower rows of FIG. 7 is an example of the case in which one collection pattern is associated with two kinds of attributes and attribute values.

The first correction example in the upper rows of FIG. 7 is an example in which the way of reading "Step 1 . . . " included in a surface expression "Step 1 . . . Press the lock button for a long time of five seconds or longer while pressing the power button." is corrected to "At Step 1, the following operation is performed.". The second correction example in the upper rows of FIG. 7 is an example in which the way of reading "Step 2 . . . " included in a surface expression "Step 2 . . . When a beep sound is emitted three times, release the hand." is corrected to "At Step 2, the following operation is performed.". The third correction example in the upper rows of FIG. 7 is an example in which the way of reading "Step 3 . . . " included in a surface expression "Step 3 . . . Press "mode button" twice, and a current status is displayed . . . " is corrected to "At Step 3, the following operation is performed.".

The fourth to the sixth correction examples in the upper rows of FIG. 7 are correction examples related to a digital accessible information system (DAISY) format, which is one of data formats to be output in the transliteration work support apparatus 100 of the present embodiment. The DAISY format is characterized by clearly specifying a hierarchy definition and page information in addition to general HTML elements.

The fourth correction example in the upper rows of FIG. 7 is an example in which the DaisyLevel of the surface expression "Step 1 . . . Press the lock button for a long time of five seconds or longer while pressing a power button." is corrected to 3. To be more specific, the hierarchy definition is performed by specifying 3 as an argument of setDaisyLevel assigning a hierarchy definition in DAISY (any of 1 to 6). In the fourth correction example, the value of level 3 is assigned to the line of the surface expression "Step 1 . . . Press the lock button for a long time of five seconds or longer while pressing a power button.". Similarly, the fifth correction example in the upper rows of FIG. 7 is an example in which the DaisyLevel of the surface expression "Step 2 . . . When a beep sound is emitted three times, release the hand." is corrected to 3. Similarly, the sixth correction example in the upper rows of FIG. 7 is an example in which the DaisyLevel of the surface expression "Step 3 . . . Press "mode button" twice and a current status is displayed . . . " is corrected to 3.

The first to the third correction examples in the upper rows of FIG. 7 have the same regularity in way of correction. Thus, the surface expressions of the first to the third correction examples in the upper rows of FIG. 7 can be collected as a correction pattern ""Step" (+number) . . . ($TEXT)" in the lower rows of FIG. 7. Here, the "(+number)" indicates an arbitrary number. Moreover, the "($TEXT)" indicates an arbitrary character string. Moreover, the first to the third attribute values in the upper rows of FIG. 7 can be collected as the first attribute value in the lower rows of FIG. 7 "At "Step"% d, the following operation is performed. $TEXT". The "% d" indicates the number following "Step" in the surface expression matching the correction pattern in the lower rows of FIG. 7. The "$TEXT" indicates a character string following " . . . " matching the correction pattern in the lower rows of FIG. 7.

Similarly, the fourth to the sixth correction examples in the upper rows of FIG. 7 have the same regularity in way of correction. Thus, the fourth to the sixth surface expressions in the upper rows of FIG. 7 can be collected as a correction pattern ""Step" (+number) . . . ($TEXT)" in the lower rows of FIG. 7.

The following will describe the correction pattern information 12 storing correction patterns generated by the generation unit 1 in the manner illustrated in FIG. 6 and FIG. 7. FIG. 8 is a diagram illustrating an example of the correction pattern information 12 according to the present embodiment. The correction pattern information 12 is stored by a relational database management system (RDBMS) having a schema illustrated in FIG. 8, for example. The correction pattern information 12 includes fields of a correction pattern ID, a document ID, a correction pattern, an attribute, an attribute value, the priority, and an appearance frequency.

The correction pattern ID is identification information for uniquely identifying a record of the correction pattern information 12. The document ID is identification information for uniquely identifying document information. The correction pattern is an expression for collecting a plurality of surface expressions having the same regularity in way of correction as one form by expressing them as a regular expression and the like. When a surface expression cannot be expressed collectively by a regular expression and the like, the correction pattern is the surface expression itself. The attribute indicates the kind of correction. The attribute value indicates a way of correction. The priority is set when one correction pattern is associated with a plurality of corrections of the same attribute (attribute values). The attribute value of a record with a smaller value in priority is referred to preferentially. The appearance frequency is set when a correction pattern is a surface expression itself. The appearance frequency indicates the number of surface expressions in which a correction specified by an attribute and an attribute value of the record has been performed, and the number of the surface expressions included in all of document information with a document ID. The generation unit 1 may set the priority based on the appearance frequency. The generation unit 1 may set a higher priority for a higher appearance frequency.

Each record of the correction pattern information 12 will be described concretely. The first record specified by a correction pattern ID 1 indicates an example in which a correction specified by the attribute "way of reading" and the attribute value "database" has been performed on the correction pattern "DB" included in the document information with the document ID 1. The priority of this correction example is 1. Moreover, it is indicated that the appearance frequency of "DB" is "TF=15(230)". This indicates that "DB" appears at 230 parts in all of the documents and, at 15 parts, among them, in the document information with the document ID 1, the way of reading "DB" has been corrected to "database".

The second record specified by a correction pattern ID 2 indicates an example in which a correction specified by the attribute "way of reading" and the attribute value "dragon battle" has been performed on the correction pattern "DB" included in the document information with the document ID 900. The priority of this correction example is 2. Moreover, it is indicated that the appearance frequency of "DB" is "TF=3(230)". This indicates that "DB" appears at 230 parts in all of the documents and, at three parts, among them, in the document information with the document ID 900, the way of reading "DB" has been corrected to "dragon battle".

The third record specified by a correction pattern ID 3 indicates an example in which a correction specified by the attribute "way of reading" and the attribute value "decibel" has been performed on the correction pattern "db" included in the document information with the document ID 10. The priority of this correction example is not set. Moreover, it is indicated that the appearance frequency of "db" is "TF=5 (10)". This indicates that "db" appears at 10 parts in all of the documents and, at five parts, among them, in the document information with the document ID 10, the way of reading "db" has been corrected to "decibel".

The fourth record specified by a correction pattern ID 4 indicates an example in which a correction specified by the attribute "way of reading" and the attribute value "database" has been performed on the correction pattern "DataBase" included in the document information with the document ID 1020. The priority of this correction example is not set. Moreover, it is indicated that the appearance frequency of "DataBase" is "TF=12(123)". This indicates that "Data-Base" appears at 123 parts in all of the documents and, at 12 parts, among them, in the document information with the document ID 1020, the way of reading "DataBase" has been corrected to "database".

The fifth record specified by a correction pattern ID 5 indicates an example in which a correction specified by the attribute "pause" and an attribute value 32 has been performed on a correction pattern 31 included in the document information with the document ID 101. The priority and the appearance frequency of the correction example are not set because the correction pattern is not a surface expression itself. The "$NE" included in the correction pattern 31 and the attribute value 32 indicates an arbitrary named entity. The named entity is a personal name, for example.

The sixth record specified by a correction pattern ID 6 indicates an example in which a correction specified by the attribute "pause" and an attribute value 34 has been performed on a correction pattern 33 included in the document information with the document ID 133. The sixth record corresponds to the example described above with reference to FIG. 6.

The transliteration work support apparatus 100 stores the correction pattern information 12 for each type (kind) of document information. This is because a correction pattern (a surface expression to be corrected) and an attribute value indicating a way of correction are different depending on the kind of document information. The type of document information is "book catalog", "manual" and the like.

Returning to FIG. 1, the input unit 2 receives document information. The input unit 2 inputs the received document information to the extraction unit 3. The extraction unit 3 refers to correction patterns of all of the correction pattern information 12 stored for each type of document information and extracts, as correction parts, surface expressions of the document information matching correction patterns, for each type of document information. Moreover, the extraction unit 3 obtains records including the correction patterns used in the extraction of the correction parts from the correction pattern information 12. Then, the extraction unit 3 inputs the records including the correction parts extracted for each type of document information and the correction patterns of the correction pattern information 12 used in the extraction of the correction parts, to the presentation unit 4. The extraction unit 3 inputs the document information received from the input unit 2 to the presentation unit 4.

The presentation unit 4 presents the correction parts of the document information and the attribute values (ways of correction) associated with the correction patterns used in the extraction of the correction parts of the document information, as correction candidates. The reception unit 5 receives selection of the correction candidate presented by the presentation unit 4. The correction unit 6 corrects the correction parts of the document information in accordance with the selection received by the reception unit 5. The correction unit 6 stores, when the way of transliteration of correction parts is corrected, the way of transliteration of the correction parts (words, symbols, and the like included in the document information) as auxiliary transliteration information (meta data). The auxiliary transliteration information is input together with the document information to a voice synthesis engine, whereby desired voice data can be obtained in accordance with the auxiliary transliteration information. Here, a concrete example of correction candidates presented by the presentation unit 4 will be described.

FIG. 9 is a diagram illustrating a concrete example 1 of correction candidates provided by the presentation unit 4 according to the present embodiment. Generally, an appropriate correction candidates change depending on a document type (the kind of document). Thus, the presentation unit 4 changes correction candidates presented in accordance with a document type. Moreover, the presentation unit 4 changes correction candidates presented in accordance with an attribute (the kind of correction). To be more specific, the presentation unit 4 changes correction candidates presented in accordance with the document type and the attribute received by the reception unit 5. FIG. 9 is an example of the case in which when the document type is "book catalog" and the attribute indicated by the kind of correction is "pause", a correction part 44 and attribute values 41 to 43 are presented as correction candidates. In the example of FIG. 9, the pause information of the correction part 44 is corrected by selecting one of the correction candidate 1 to the correction candidate 3 from a pull-down menu. When the reception unit 5 has received the selection of the candidate 1 from the pull-down menu, the correction unit 6 applies the correction of the attribute value 41 to the correction part 44. When the reception unit 5 has received the selection of the candidate 2 from the pull-down menu, the correction unit 6 applies the correction of the attribute value 42 to the correction part 44. When the reception unit 5 has received the selection of the candidate 3 from the pull-down menu, the correction unit 6 applies the correction of the attribute value 43 to the correction part 44.

Figure 10:
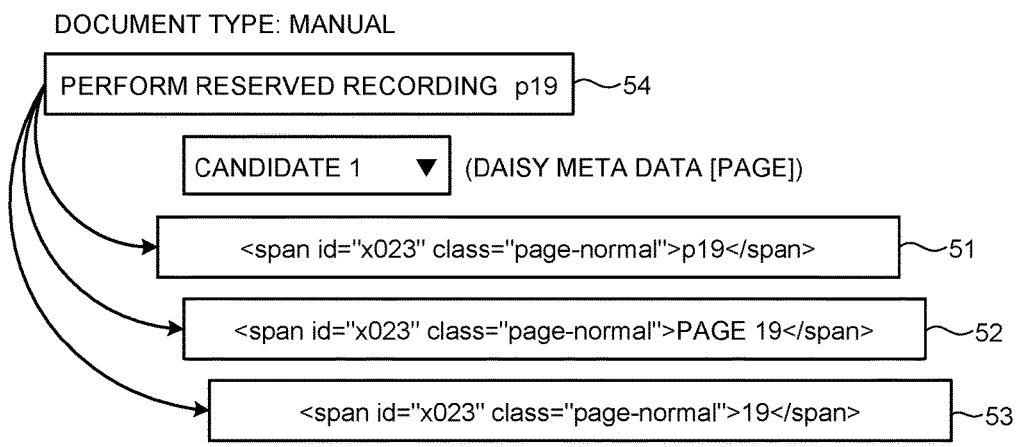
FIG. 10 is a diagram illustrating a concrete example 2 of correction candidates presented by the presentation unit according to the embodiment.

FIG. 10 is a diagram illustrating a concrete example 2 of correction candidates presented by the presentation unit 4 according to the present embodiment. FIG. 10 is an example of the case in which when the document type is "manual" and the attribute indicated by the kind of correction is "DAISY meta data[page]", a correction part 54 and attribute values 51 to 53 are presented as correction candidates. In the example of FIG. 10, the DAISY meta data related to a page of the correction part 54 is corrected by selecting one of the correction candidate 1 to the correction candidate 3 from a pull-down menu. When the reception unit 5 has received the selection of the candidate 1 from the pull-down menu, the correction unit 6 applies the correction of the attribute value 51 to the correction part 54. That is, the page is expressed as "p19", and "span id="x023"" and "class="page-normal"" are given as meta data related to the page. When the reception unit 5 has received the selection of the candidate 2 from the pull-down menu, the correction unit 6 applies the correction of the attribute value 52 to the correction part 54. That is, the page is expressed as "page 19", and "span id="x023"" and "class="page-normal"" are given as meta data related to the page. When the reception unit 5 has received the selection of the candidate 3 from the pull-down menu, the correction unit 6 applies the correction of the attribute value 53 to the correction part 54. That is, the page is expressed as "19", and "span id="x023"" and "class="page-normal"" are given as meta data related to the page.

Returning to FIG. 1, the correction unit 6 corrects the correction parts of the document information, and inputs the document information and the auxiliary transliteration information to the output unit 7. The output unit 7 outputs the document information and the auxiliary transliteration information in a predetermined data format. The predetermined data format is a data format of document information and auxiliary transliteration information that can be input to the voice synthesis engine.

Figure 11:
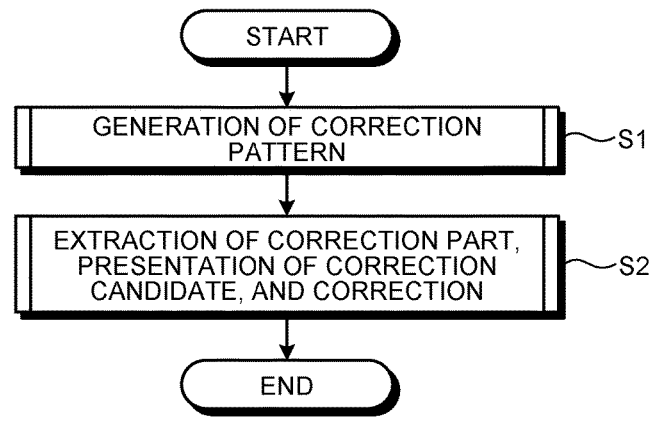
FIG. 11 is a diagram illustrating an entire flow of a transliteration work support method according to the embodiment.

The following will describe the transliteration work support method of the present embodiment. FIG. 11 is a diagram illustrating an entire flow of the transliteration work support method according to the present embodiment. The transliteration work support method of the present embodiment includes generating a correction pattern (Step S1); extracting correction parts; presenting correction candidates; and performing correction (Step S2). First, the generation of a correction pattern (Step S1) will be described.

Figure 12A:
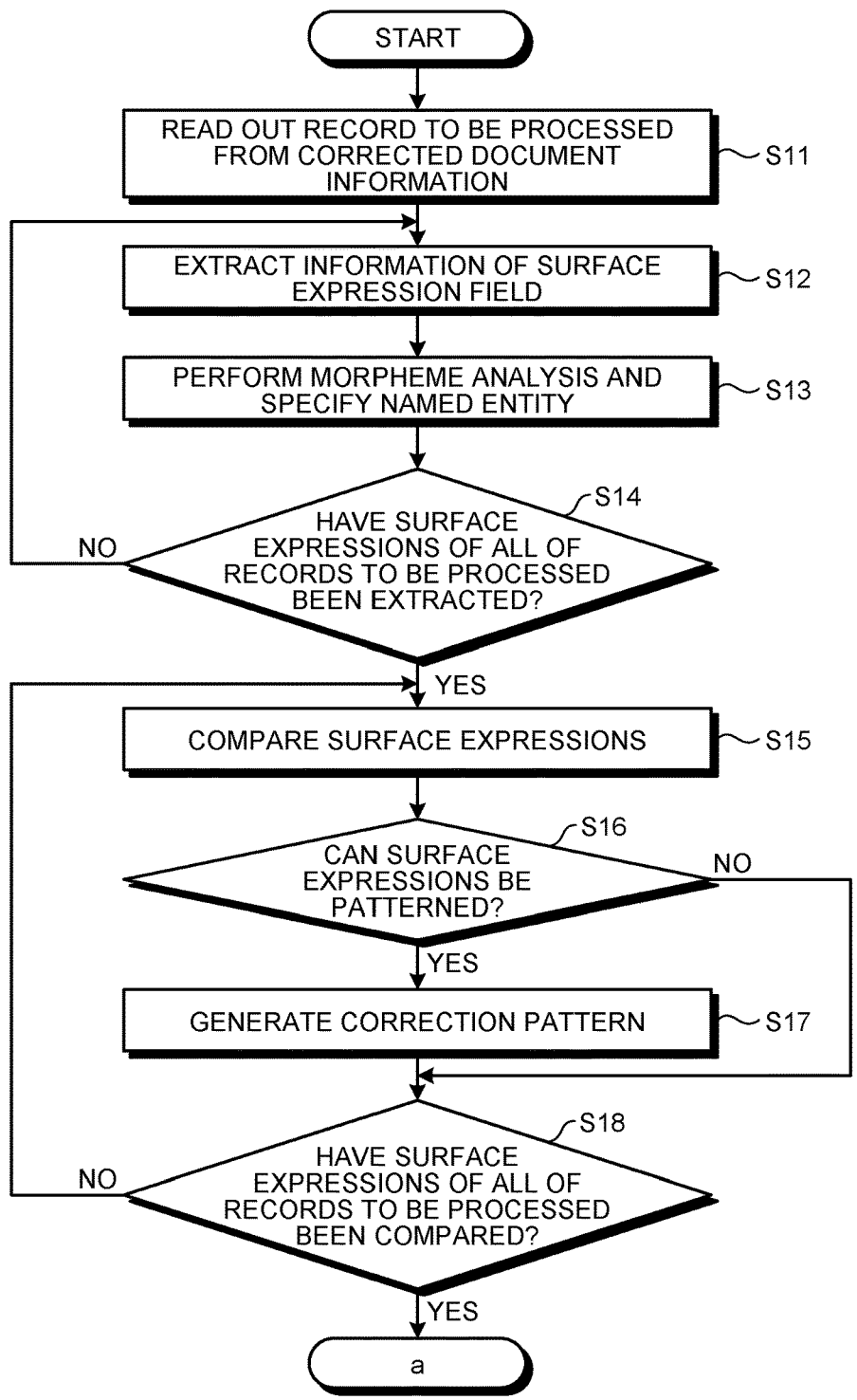
FIG. 12A is a diagram illustrating an example of correction pattern generation process according to the embodiment.
Figure 12B:
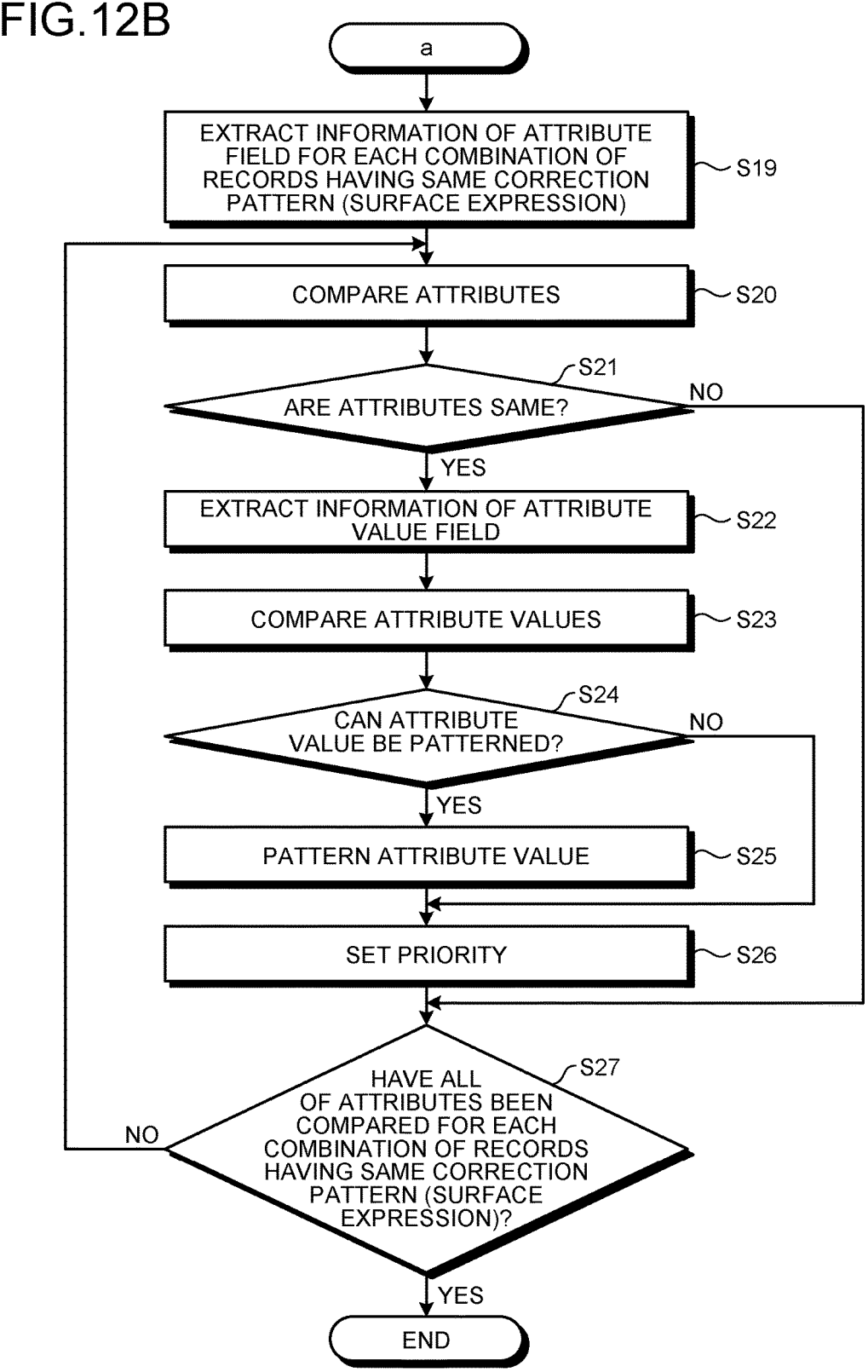
FIG. 12B is a diagram illustrating an example of the correction pattern generation process according to the embodiment.

FIG. 12A and FIG. 12B are diagrams illustrating an example of a correction pattern generation process according to the present embodiment. The generation unit 1 firstly reads out a record to be processed from the corrected document information 11 (Step S11). The record to be processed may be all of the records of the corrected document information 11 or a part thereof. Next, the generation unit 1 extracts information of a surface expression field of the record read out at Step S11 (Step S12). Then, the generation unit 1 performs a morpheme analysis and specifies a named entity regarding the surface expression extracted at Step S12 (Step S13). The processing result of Step S13 is used for comparison of surface expressions (Step S15 described later). Then, the generation unit 1 determines whether the surface expressions of all of the records to be processed have been extracted (Step S14).

When the surface expressions of all of the records to be processed have not been extracted (No at Step S14), the processing returns to Step S12. When the surface expressions of all of the records to be processed have been extracted (Yes at Step S14), the generation unit 1 compares the extracted surface expressions one another (Step S15). Then, the generation unit 1 determines whether the surface expressions can be patterned by expressing a part or all of the surface expressions collectively as a regular expression and the like (Step S16). When the surface expressions can be patterned (Yes at Step S16), the generation unit 1 generates a correction pattern that expresses a plurality of surface expressions in one form by collectively expressing a part or all of the surface expressions as a regular expression and the like (Step S17). When the surface expressions cannot be patterned (No at Step S16), the processing shifts to Step S18.

Subsequently, the generation unit 1 determines whether the surface expressions of all of the records to be processed have been compared (Step S18). When the surface expressions of all of the records to be processed have not been compared (No at Step S18), the processing returns to Step S15.

When the surface expressions of all of the records to be processed have been compared (Yes at Step S18), the generation unit 1 extracts information of the attribute field for each combination of records having the same correction pattern (the surface expressions themselves when the surface expression cannot be collected in one form) (Step S19). Next, the generation unit 1 compares the attributes extracted at Step S19 one another (Step S20). Subsequently, the generation unit 1 determines whether there exist records having the same attribute (Step S21). When there do not exist records having the same attribute (No at Step S21), the processing shifts to Step S27.

When there exist records having the same attribute (Yes at Step S21), information of the attribute value field of each of the records having the same attribute is extracted (Step S22). Subsequently, the generation unit 1 compares the attribute values extracted at Step S22 one another (Step S23). Then, the generation unit 1 determines whether the attribute values can be patterned by expressing a part or all of the attribute values collectively as a regular expression and the like (Step S24). When the attribute values can be patterned (Yes at Step S24), the generation unit 1 collectively expresses a plurality of attribute values in one form by collectively expressing a part or all of the attribute values as a regular expression and the like (Step S25). When the surface expressions cannot be patterned (No at Step S24), the processing shifts to Step S26.

Next, among the combinations of a correction pattern (a surface expression itself when the surface expression cannot be collected in one form), an attribute (the kind of correction), and an attribute value (a way of correction), the generation unit 1 sets the priority regarding the combinations having the same correction pattern and attribute but a different attribute value (Step S26). The priority is used for determination of the order in which the presentation unit 4 presents attribute values as correction candidates, for example.

Then, for each combination of records having the same correction pattern (the surface expression itself when the surface expression cannot be collected in one form), the generation unit 1 determines whether all of the attributes included in the combination have been compared (Step S27). When all of the attributes included in the combination have not been compared (No at Step S27), the processing returns to Step S20. When all of the attributes included in the combination have been compared (Yes at Step S27), the processing is finished.

Figure 13:
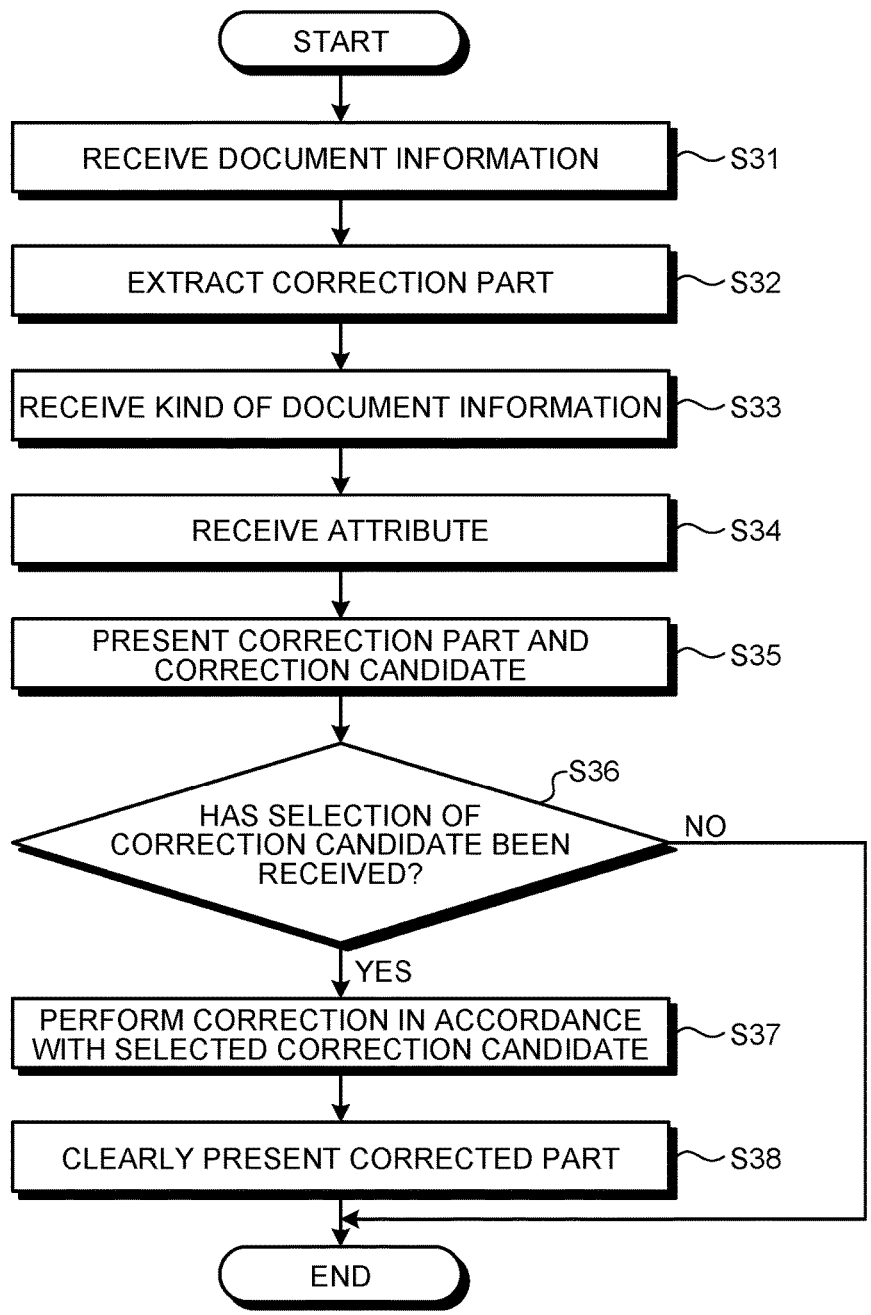
FIG. 13 is a diagram illustrating an example of processes of extracting correction parts, presenting correction candidates, and performing correction.

Returning to FIG. 11, the processes of extracting correction parts, presenting correction candidates, and performing correction (Step S2) will be described. FIG. 13 is a diagram illustrating an example of processes of extracting corrected parts, presenting correction candidates, and performing correction. First, the input unit 2 receives an input of document information (Step S31). Next, the reception unit 5 extracts correction parts for each kind of document information using correction patterns of the correction pattern information 12 stored for each type (kind) of document information (Step S32).

Then, the reception unit 5 receives the kind of document information (Step S33). Then, the reception unit 5 receives an attribute (Step S34). Subsequently, the presentation unit 4 presents correction parts and correction candidates based on the kind of document information received at Step S33 (Step S35). To be more specific, the presentation unit 4 presents correction parts extracted based on correction patterns of the correction pattern information 12 with the kind of document information most similar to the kind of document information received at Step S33. The presentation unit 4 presents the correction parts with highlighting (marking) by underlines, a changed color or font of character strings (including the number, symbols, and the like) or a highlight of a background, for example. Here, the presentation unit 4 may change the way of highlighting correction parts depending on an attribute (the kind of correction). The presentation unit 4 presents attribute values associated with the correction patterns as correction candidates.

Next, the reception unit 5 determines whether the selection of a correction candidate has been received (Step S36).

When the selection of a correction candidate has been received (Yes at Step S36), the correction unit 6 applies the correction in accordance with the selected correction candidate to the document information (Step S37). Here, the correction unit 6 stores, when the way of transliteration of correction parts is corrected, the way of transliteration of the correction parts (words, symbols, and the like included in the document information) as auxiliary transliteration information (meta data). Then, the presentation unit 4 clearly presents the parts corrected at Step S37 with highlighting (marking) (Step S38). When the selection of the correction candidate has not been received (No at Step S36), the correction process of the correction part is finished without any correction by the correction unit 6.

As described above, the transliteration work support apparatus 100 of the present embodiment stores the correction pattern information 12 in which a correction pattern expressing a plurality of surface expressions having the same regularity in way of correction in one form is associated with an attribute indicating the kind of correction and an attribute value indicating a way of correction. Then, the extraction unit 3 extracts, as correction parts, surface expressions of document information matching the correction patterns, and the presentation unit 4 presents the correction parts of document information and the attribute values (ways of correction) associated with the correction pattern used in the extraction of the correction parts of the document information, as correction candidates. In this manner, the correction parts and the way of corrections can be grasped, which enables efficient transliteration work of document information.

The voice data generated by the voice synthesis engine requires fine corrections in accordance with the kind of document information. The transliteration work support apparatus 100 of the present embodiment presents correction candidates based on not only the diverted history information of corrected surface expressions themselves but also the above-described correction patterns in particular. Therefore, the history of transliteration work of document information corrected in the past can be used for transliteration work of surface expressions that are not same but have a similar form or structure. This enables efficient transliteration work of document information.

Modification of Embodiment

In the transliteration work support apparatus 100 of the embodiment described above, the extraction unit 3 extracts correction parts using the correction patterns generated based on the correction history in the past. However, the extraction unit 3 may extract correction parts using a standard correction pattern not depending on the correction patterns generated based on the correction history in the past. The modification of the present embodiment will describe the case in which the transliteration work support apparatus 100 supports transliteration work by presenting correction candidates using the standard correction pattern information.

FIG. 14 is a diagram illustrating an example of standard correction pattern information according to a modification of the embodiment. To be more specific, the example of FIG. 14 illustrates an example of document information with a document ID "301" extracted by the extraction unit 3 using the standard correction pattern information. The information extracted using the standard correction pattern information is stored by a relational database management system (RDBMS) having a schema illustrated in FIG. 14, for example.

The standard correction pattern information includes fields of a correction pattern ID, a document ID, a correction pattern, an attribute, an attribute value, a priority, and an appearance frequency. The schema of the standard correction pattern information is same as that of the above-described correction pattern information. Thus, the explanation thereof is omitted. Each record of the standard correction pattern information will be described concretely.

The first record specified by a correction pattern ID "D1" indicates that the document information with the document ID "301" includes a line in which the number of indent (the number of space in the beginning of the line) is 0. Similarly, the second record specified by a correction pattern ID "D2" indicates that the document information with the document ID "301" includes a line in which the number of indent (the number of space in the beginning of the line) is 4.

The third record specified by a correction pattern ID "D3" indicates that the document information with the document ID "301" includes description by itemization (symbol "•", a series of head symbols that are consecutive numbers of 1, 2, and 3) at three parts.

The fourth record specified by a correction pattern ID "D4" indicates that the document information with the document ID "301" includes description of font change at eight parts. Regarding the attribute value of the fourth record specified by the correction pattern ID "D4", the number of times of decorations on characters such as the size or the boldness is detected based on tag information (<h1> tag, <b> tag, or the like of HTML document) of document information, for example.

The fifth record specified by a correction pattern ID "D5" indicates that the document information with the document ID "301" includes description of URL at three parts.

The sixth record specified by a correction pattern ID "D6" indicates that the document information with the document ID "301" includes description of named entity such as a personal name or a location name at 17 parts.

The presentation unit 4 according to the modification of the embodiment presents the attributes specified by the correction pattern IDs "D1" to "D6", so that a user can correct altogether correction parts related to the attributes if necessary. In the example of FIG. 14, the presentation unit 4, for example, presents that there are two ways for setting an indent (zero character and four characters) in the document information with the document ID "301". With this, the user of the transliteration work support apparatus 100 can perform altogether correction for unifying the setting of an indent, for example. Moreover, the presentation unit 4 presents that the document information with the document ID "301" includes description of URL at three parts. With this, the user of the transliteration work support apparatus 100 can perform altogether correction for setting a hyperlink tag (<a href=. . . />) in the description of the URL. Moreover, the presentation unit 4 presents that the document information with the document ID "301" includes description of named entity at 17 parts. With this, the user of the transliteration work support apparatus 100 can perform altogether correction for setting a specification tag of voice synthesis (<prosody pitch="+1" voice="+10">) for reading out the named entity slowly in a loud voice.

As described above, the transliteration work support apparatus 100 according to the modification of the embodiment presents not only correction candidates in accordance with correction patterns based on correction examples in the past but also correction parts to be corrected standardly. This enables efficient transliteration work of document information.

Figure 15:
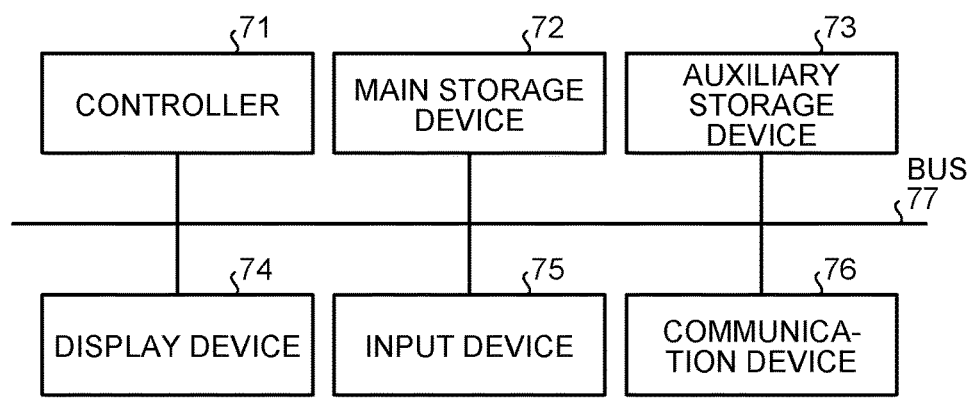
FIG. 15 is a diagram illustrating an example of a hardware configuration of the transliteration work support apparatus according to the embodiment.

Finally, a hardware configuration of the transliteration work support apparatus 100 of the present embodiment will be described. FIG. 15 is a diagram illustrating an example of a hardware configuration of the transliteration work support apparatus 100 according to the present embodiment.

The transliteration work support apparatus 100 of the present embodiment includes a controller 71, a main storage device 72, an auxiliary storage device 73, a display device 74, an input device 75, and a communication device 76. The controller 71, the main storage device 72, the auxiliary storage device 73, the display device 74, the input device 75, and the communication device 76 are connected one another through a bus 77.

The controller 71 executes a computer program read out from the auxiliary storage device 73 to the main storage device 72. The main storage device 72 is a memory such as a read only memory (ROM), a random access memory (RAM) and the like. The auxiliary storage unit 73 is a hard disc or a memory card, for example. The display device 74 is a screen for displaying the state of the transliteration work support apparatus 100, for example. The display device 74 is a liquid crystal display, for example. The input device 75 is an interface for operating the transliteration work support apparatus 100. The input device 75 is a keyboard or a mouse, for example. The communication device 76 is an interface for connection to a network.

The computer program executed by the transliteration work support apparatus 100 of the present embodiment may be recorded in a computer-readable recording medium such as a compact disc read only memory (CD-ROM), a memory card, a compact disc recordable (CD-R), and a digital versatile disc (DVD), as an installable or executable file, and provided as a computer program product. The computer program executed by the transliteration work support apparatus 100 of the invention may be stored in a computer connected to a network such as the Internet and provided by being downloaded via the network. Furthermore, the computer program executed by the transliteration work support apparatus 100 of the invention may be provided or distributed via a network such as the Internet without downloading. Moreover, the computer program of the transliteration work support apparatus 100 of the present embodiment may be preliminarily embedded and provided in a ROM, for example.

The computer program executed by the transliteration work support apparatus 100 of the present embodiment has a module configuration including function blocks that can be achieved as a computer program (generation unit 1, input unit 2, extraction unit 3, presentation unit 4, reception unit 5, correction unit 6, and output unit 7), among the function blocks of the transliteration work support apparatus 100 described above.

As actual hardware, the controller 71 reads out the computer program from the above-described storage medium and executes it, whereby each module is loaded onto the main storage device 72. That is, each module described above is generated on the main storage device 72. Note that a part of the function blocks or all of them in the transliteration work support apparatus 100 may be achieved by not a computer program but hardware such as an integrated circuit (IC).

What is claimed is:

1. A transliteration work support apparatus, comprising:
a memory; and
one or more hardware processors electrically coupled to the memory and configured to function as:
an input unit configured to receive document information;
an extraction unit configured to extract, as a correction part, a surface expression of the document information that matches a correction pattern expressing a plurality of surface expressions having the same regularity in way of correction in one form;
a presentation unit configured to present a way of correction defined in accordance with the correction pattern used in the extraction of the correction part;
a reception unit configured to receive selection of the way of correction; and
a correction unit configured to correct the correction part based on the selected way of correction.

2. The apparatus according to claim 1, further comprising a generation unit configured to generate correction pattern information in which the correction pattern is associated with the way of correction based on a correction history of the document information, wherein
the extraction unit extracts, as a correction part, a surface expression of the document information that matches the correction pattern of the correction pattern information, and
the presentation unit presents a way of correction associated with the correction pattern of the correction pattern information used in the extraction of the correction part.

3. The apparatus according to claim 1, wherein
the correction pattern and the way of correction defined in accordance with the correction pattern are defined for each kind of the document information, and
the extraction unit extracts a correction part of the document information using the correction pattern with the kind of the document information most similar to the kind of the document information received by the input unit.

4. The apparatus according to claim 1, wherein the presentation unit presents the correction part of the document information with highlighting.

5. The apparatus according to claim 1, wherein
the reception unit further receives the kind of correction, and
the presentation unit presents a way of correction defined in accordance with the correction pattern used in the extraction of the correction part, in accordance with the kind of correction.

6. The apparatus according to claim 5, wherein the presentation unit changes a way of highlighting the correction part of the document information in accordance with the kind of correction.

7. A transliteration work support method, comprising:
receiving, by one or more hardware processors, document information;
extracting, by the one or more hardware processors, as a correction part, a surface expression of the document information that matches a correction pattern expressing a plurality of surface expressions having the same regularity in way of correction in one form;
presenting, by the one or more hardware processors, a way of correction defined in accordance with the correction pattern used in the extraction of the correction part;
receiving, by the one or more hardware processors, selection of the way of correction; and
correcting, by the one or more hardware processors, the correction part based on the selected way of correction.

8. A computer program product comprising a non-transitory computer-readable medium storing thereon programmed instructions that cause a computer to function as:
- an input unit configured to receive document information;
- an extraction unit configured to extract, as a correction part, a surface expression of the document information that matches a correction pattern expressing a plurality of surface expressions having the same regularity in way of correction in one form;
- a presentation unit configured to present a way of correction defined in accordance with the correction pattern used in the extraction of the correction part;
- a reception unit configured to receive selection of the way of correction; and
- a correction unit configured to correct the correction part based on the selected way of correction.

* * * * *